(12) United States Patent
Falter et al.

(10) Patent No.: US 7,620,934 B2
(45) Date of Patent: Nov. 17, 2009

(54) SYSTEM AND METHOD FOR A WEB SERVICE DEFINITION

(75) Inventors: Timm Falter, Sinshein (DE); Joachim Bender, Weinheim (DE); Martin Huvar, Sinshein (DE); Vladimir Savchenko, Sofia (BG); Volker Wiechers, Heidelberg (DE)

(73) Assignee: SAP AG, Walldorf (DE)

( * ) Notice: Subject to any disclaimer, the term of this patent is extended or adjusted under 35 U.S.C. 154(b) by 402 days.

(21) Appl. No.: 10/856,073

(22) Filed: May 28, 2004

(65) Prior Publication Data

US 2005/0278348 A1    Dec. 15, 2005

(51) Int. Cl.
*G06F 9/44* (2006.01)

(52) U.S. Cl. .................. 717/106; 719/320; 719/328; 709/223

(58) Field of Classification Search .............. 717/104, 717/106, 108, 114, 116, 118; 719/320, 328; 709/223; 707/100
See application file for complete search history.

(56) References Cited

U.S. PATENT DOCUMENTS

| | | | | |
|---|---|---|---|---|
| 5,956,487 | A * | 9/1999 | Venkatraman et al. | 709/218 |
| 6,985,939 | B2 * | 1/2006 | Fletcher et al. | 709/223 |
| 7,017,162 | B2 | 3/2006 | Smith et al. | |
| 7,114,146 | B2 | 9/2006 | Zhang et al. | |
| 7,127,700 | B2 | 10/2006 | Large | |
| 7,266,582 | B2 | 9/2007 | Stelting | |
| 2002/0143819 | A1 * | 10/2002 | Han et al. | 707/513 |
| 2003/0023957 | A1 | 1/2003 | Bau, III et al. | |
| 2003/0233631 | A1 | 12/2003 | Curry et al. | |
| 2004/0023957 | A1 * | 2/2004 | Wang et al. | 514/230.5 |
| 2004/0064503 | A1 | 4/2004 | Karakashian et al. | |
| 2004/0133876 | A1 * | 7/2004 | Sproule | 717/105 |
| 2004/0177335 | A1 | 9/2004 | Beisiegel et al. | |
| 2004/0187140 | A1 | 9/2004 | Aigner et al. | |
| 2004/0199896 | A1 | 10/2004 | Goodman et al. | |
| 2004/0205104 | A1 | 10/2004 | Harvey et al. | |
| 2005/0015491 | A1 | 1/2005 | Koeppel | |
| 2005/0038867 | A1 * | 2/2005 | Henderson et al. | 709/217 |
| 2005/0044197 | A1 * | 2/2005 | Lai | 709/223 |
| 2005/0216600 | A1 | 9/2005 | Maron | |
| 2005/0235274 | A1 | 10/2005 | Mamou et al. | |
| 2006/0095274 | A1 | 5/2006 | Phillips et al. | |
| 2007/0271554 | A1 | 11/2007 | Fletcher et al. | |

OTHER PUBLICATIONS

Birbeck et al—Professional XML 2nd Edition 2001—"B2B Futures: WSDL and UDDI" pages—cover of book, chapter 27 cover page and 1192-1218.

* cited by examiner

*Primary Examiner*—Pierre M Vital
*Assistant Examiner*—Christopher J Raab
(74) *Attorney, Agent, or Firm*—Blakely Sokoloff Taylor & Zafman

(57) ABSTRACT

Embodiments of the invention are generally directed to a system and method for a Web service definition. A development environment may receive input selecting a Web service interface. The development environment may also receive input to specify one or more system independent features of the selected interface. In an embodiment, the development environment may create a Web service definition descriptor file that includes the received input specifying the one or more system independent features.

43 Claims, 12 Drawing Sheets

SYSTEM AND METHOD FOR A WEB SERVICE DEFINITION

TECHNICAL FIELD

Embodiments of the invention generally relate to the field of Web services and, more particularly, to a system and method for a Web service definition.

BACKGROUND

Web services are, in general terms, computer software (or, for ease of reference, software) based services that are provided over a network (e.g., the Internet). More specifically, Web services are self-contained, modularized, executable entities that can be published, searched for, and accessed across a network. Web services are portable across disparate computing platforms because they are implemented according to widely accepted standards.

FIG. 1 is a block diagram of the basic architecture of a conventional Web services framework 100. Conventional Web services framework 100 includes service provider 110, service consumer 120, and service directory 130. Service provider 110 may be, for example, a Web application server that is implemented according to any of the Java 2 Enterprise Edition specifications, for example, v1.3, published on Jul. 27, 2001 (hereinafter, the J2EE standard). One or more Web services are deployed on service provider 110. These Web services comply, at least in part, with the basic Web services standards including: the Extensible Markup Language (XML) standard promulgated by the World Wide Web Consortium (W3C) entitled, "Extensible Markup Language (XML) 1.0 (Second Edition)," 6 Oct. 2000 (hereinafter, the XML standard) and the Simple Object Access Protocol (SOAP) promulgated by the W3C entitled, "SOAP Version 1.1 Part 1: Messaging Framework and Part 2: Adjuncts," 24 Jun. 2003 (hereinafter, the SOAP protocol).

Service provider 110 publishes one or more Web services on service directory 130 via Web Service Definition Language (WSDL) document 140. A WSDL document may be a document that complies, at least in part, with any of the WSDL standards, for example, the WSDL standard promulgated by W3C entitled, "Web Services Description Language 1.1," 15 Mar. 2001 (hereinafter, the WSDL standard). WSDL document 140 is an XML document that provides pertinent information about a Web service such as its name, the methods that can be called, the parameters for the methods, and a location for sending requests.

Service directory 130 is a registry and discovery service for Web services. Service directory 130 may implement one of the Universal, Discovery, Description, and Integration of Web services (UDDI) specifications, for example, UDDI Version 3.0, Published Specification, Dated 19 Jul. 2002 (hereinafter, the UDDI specification). The UDDI specification defines a set of SOAP messages that are used to access XML-based data (e.g., WSDL document 140) in a directory. The UDDI specification also defines a registry information model to structure the data stored in service directory 130 and to make it easier to search and navigate.

Service consumer 120 is a computing device that locates and uses a Web service published in service directory 130. Service consumer 120 may be, for example, a Web application server, a general-purpose computer, personal digital assistant, telephone, and the like. Service consumer 120 may implement the UDDI specification to find and retrieve WSDL document 140. A number of files and classes may be generated based on retrieved WSDL document 140 to create a deployable Web service client package on service consumer 120. Service consumer 120 may generate a Web service client (not shown) based on the deployed Web service client package. The generated Web service client may then access the Web service from service provider 110 via, for example, the Internet.

Providing a Web service typically includes specifying the Web service behavior with respect to security, transactions, sessions, access point (e.g., Universal Resource Locator (URL)), etc. Some elements of the specified behavior are system specific. For example, the URL for an access point is clearly specific to the system providing the access point. On the other hand, some elements of the specified behavior could be defined once and remain valid on all of the systems to which the Web service is deployed. Conventional Web services do not distinguish between system specific and system independent behaviors.

SUMMARY OF THE INVENTION

Embodiments of the invention are generally directed to a system and method for a Web service definition. A development environment may receive input selecting a Web service interface. The development environment may also receive input to specify one or more system independent features of the selected interface. In an embodiment, the development environment may create a Web service definition descriptor file that includes the received input specifying the one or more system independent features.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Embodiments of the invention are generally directed to a system and method for a Web service definition. A development environment may receive input selecting a Web service interface. The development environment may also receive input to specify one or more system independent features of the selected interface. In an embodiment, the development environment may create a Web service definition descriptor file that includes the received input specifying the one or more system independent features.

Figure 2:
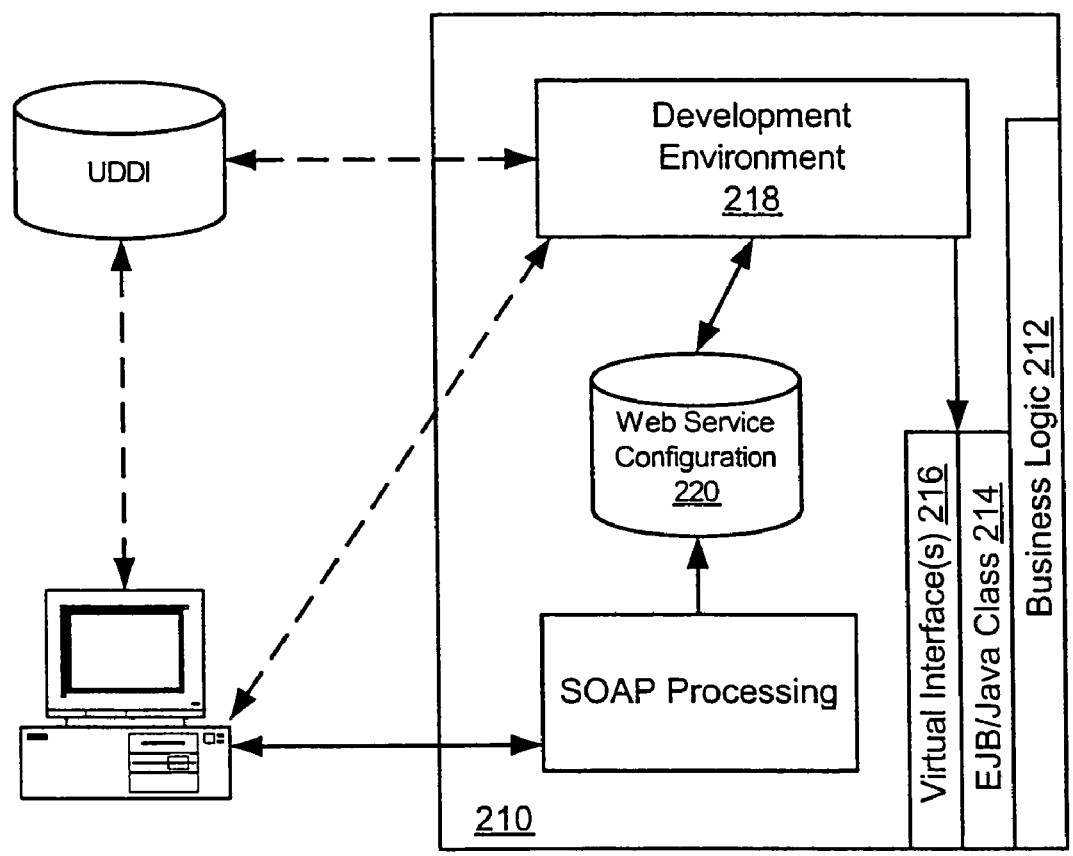
FIG. 2 is a block diagram of selected elements of a Web service provider, implemented according to an embodiment of the invention.

FIG. 2 is a block diagram of selected elements of a Web service provider 210 implemented according to an embodiment of the invention. In an embodiment, Web service provide may be part of a multi-tiered network. The multi-tiered network may be implemented using a variety of different application technologies at each of the layers of the multi-tier architecture, including those based on the Java 2 Enterprise Edition™ ("J2EE") platform, the Microsoft .NET platform, the Websphere platform developed by IBM Corporation, and/or the Advanced Business Application Programming ("ABAP") platform developed by SAP AG. Web service provider 210 includes business logic 212, web service implementation 214, virtual interface(s) 216, development environment 218, and Web service configurations 220. The term "business logic" refers to software that performs data processing. Business logic 212 may provide the operations that are packaged as a Web service.

In an embodiment, Web service implementation 214 is the actual logic provided in each Web service. Web service implementation 214 is called an "endpoint" of the Web service because it processes requests and/or provides responses. Virtual interface 216 is an abstract interface that provides a mechanism to define several views of Web service implementation 214 and to publish each view separately as a Web service. Web service configuration 220 specifies technical features of a Web service such as which transport binding to use. Web service implementation 214, virtual interface 216, and Web service configuration 220 are further described below with reference to FIG. 4.

Development environment 218 provides a software development environment for writing computer software. In an embodiment; Web service implementation 214, virtual interface 216, and/or Web service configuration 220 are developed in development environment 218. In an embodiment, development environment 218 is an implementation of, at least in part, the Eclipse Platform available under the Common Public License from the Eclipse Consortium (www.eclipse.org). In an alternative embodiment, development environment 218 may be a different development environment.

Figure 3:
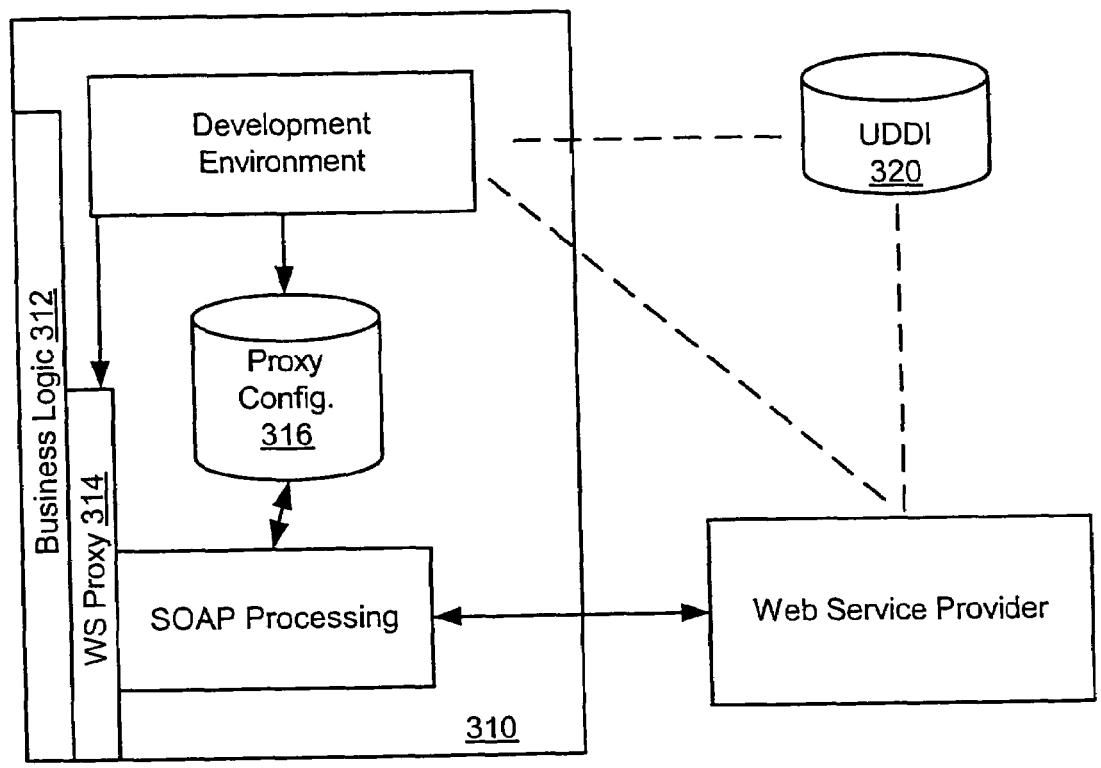
FIG. 3 is a block diagram of selected elements of a Web service consumer, implemented according to an embodiment of the invention.

FIG. 3 is a block diagram of selected elements of a Web service consumer 310, implemented according to an embodiment of the invention. In an embodiment, Web service consumer 310 includes business logic 312, Web service proxy 314, and proxy configuration 316. Business logic 312 may include an application(s) that sends a request for service to a Web service. The term "application" refers to software that performs work, such as data creation or manipulation.

In an embodiment, Web service proxy 314 is a local object that represents a Web service. Business logic 312 may access the Web service by invoking a method(s) in Web service proxy 314. In an embodiment, proxy configuration 316 specifies technical features of Web service proxy 314 such as which transport binding to use. Web service proxy 314 and proxy configuration 316 may be generated based, at least in part, on the information in a WSDL document that is downloaded from UDDI directory 320. As is further described below with reference to FIG. 6, proxy configuration 316 may map abstract features of the Web service to technical features implemented in Web service consumer 310.

Figure 4:
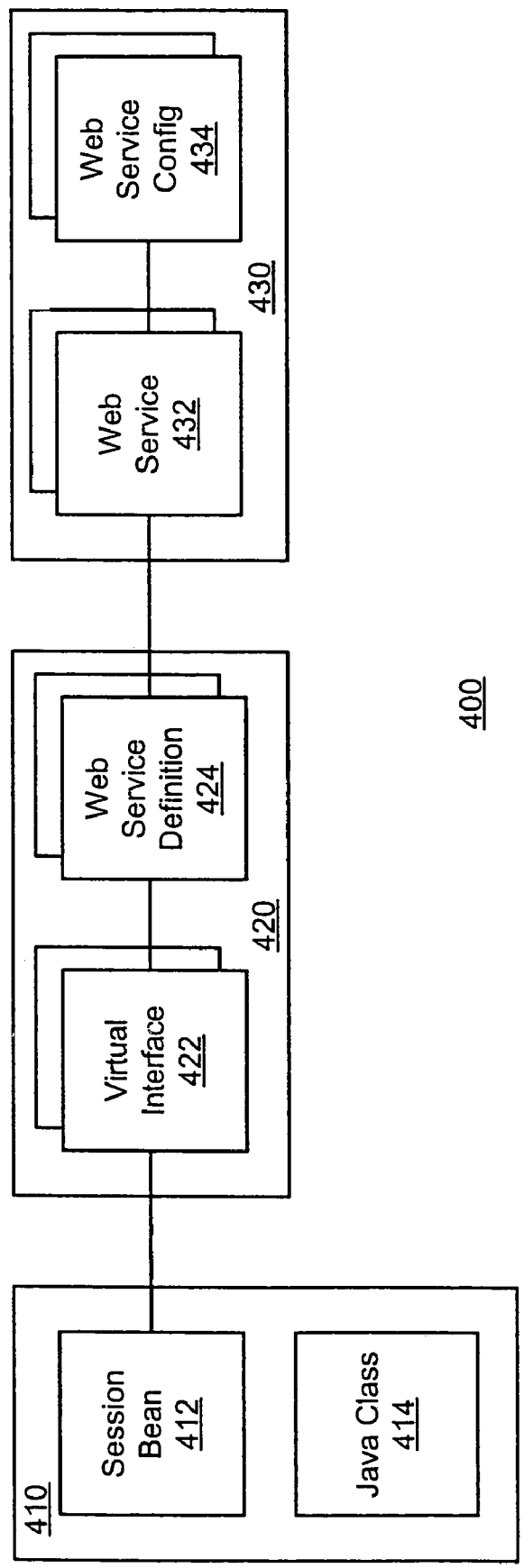
FIG. 4 is a block diagram of the general architecture of a Web service, implemented according to an embodiment of the invention.

FIG. 4 is a block diagram of the general architecture of Web service 400, implemented according to an embodiment of the invention. The illustrated embodiment includes Web service implementation 410, Web service design time part 420, and Web service configuration part 430. In alternative embodiments, the general architecture of a Web service may include more elements, fewer elements, and/or different elements. The architecture of Web service 400, as shown in FIG. 4, may be referred to as an "inside-out" architecture. The term "inside-out" refers to first developing Web service implementation 410 and then developing one or more Web service design time parts 420 and one or more Web service configuration parts 430 for Web service implementation 410.

In contrast to the architecture shown in FIG. 4, many conventional Web services have an "outside-in" architecture. An "outside-in" architecture refers to starting with a Web service design time part (e.g., Web service design time part 420) and developing a Web service implementation (e.g., Web service implementation 410). The Java Community Process (JCP) organization has promulgated a number of Java Specification Requests (JSRs) that may be implemented, at least in part, by Web service 400. For example, JSR-101 entitled, "Java Application Program Interfaces (APIs) for Extensible Markup Language based Remote Procedure Calls," Oct. 28, 2003 (hereinafter, the JAX-RPC specification) provides a standard set of Java APIs that provide a foundation for developing and deploying Web services on the Java platform. Similarly, JSR-109, entitled, "Implementing Enterprise Web Services," Nov. 15, 2002 (hereinafter, the JSR-109 specification) provides mechanisms for deploying a Web service in a Java 2 Platform, Enterprise Edition (J2EE) environment.

Web service implementation 410 is the actual logic behind Web service 400. In an embodiment, enterprise session bean 412 is the logic that provides the methods of Web service 400. The term "enterprise bean" refers to business logic that retrieves and/or processes data and provides that data to, for example, a user. In an alternative embodiment, the business logic may be provided by a different implementation. For example, in an embodiment, Web service implementation 410 is provided by Java class (or Java classes) 414. In yet another alternative embodiment, business logic 410 may be provided by, for example, an application developed in C#. The term "C#" refers to an application developed according to any of the C# programming language platforms including, for example, the C# Language Specification, Mar. 20, 2001.

In an embodiment, Web service design time part 420 provides a description of Web service 400 in terms of abstract features, rather than specific technical implementations. Thus, the developer of Web service design time part 420 may focus on the logic of Web service implementation 410 rather than the actual binding information used to expose Web service 400. In an embodiment, Web service design time part 420 includes virtual interface(s) 422 and Web service definition(s) 424. A WSDL document may be generated and published on, for example, a UDDI directory based on virtual interface 422 and Web service definition 424, in an embodiment of the invention.

Virtual interface 422 is an abstract interface that provides a mechanism for defining multiple views of Web service implementation 410. Virtual interface 422 provides multiple "views" because it selectively exposes methods and parameters of Web service implementation 410. For example, virtual interface 422 may allow a computing device to rename or hide methods and parameters of Web service implementation 410. Also, virtual interface 422 may allow the computing device to define standard values for the parameters of Web service implementation 410. In an embodiment, virtual interface 422 may selectively convert parameter types (e.g., from integer to string). In addition, virtual interface 422 may allow the computing device to define the way the parameters are represented in SOAP messages (e.g., as either an element or an attribute, namespaces, etc.). In an embodiment, multiple virtual interfaces 422 may be implemented for Web service implementation 410. In such an embodiment, each client accessing Web service 400 may have a different view of Web service implementation 410.

In addition, virtual interface 422 provides an abstraction layer over the endpoint types (e.g., an abstraction layer over the underlying EJBs and Java classes). The elements of Web service 400 that follow from virtual interface 422 (e.g., Web service definition 424 and Web service configuration part 430) are based on the abstract metadata of virtual interface 422 rather than implementation 410. Thus, in an embodiment, a SOAP runtime implementation (not shown) is not specific to implementation 410, rather it is based on the generic metadata of, for example, virtual interface 422.

Web service definition 424 is an abstract definition of the capabilities and requirements of Web service 400. In an embodiment, the capabilities of and requirements of Web service 400 are described in terms of abstract features and properties in Web service definition 424. During the configuration of Web service 400, these abstract features and properties may be mapped to specific runtime technical features. In an embodiment, the abstract features and the runtime features mapped to them are the basis for a Web service client (not shown). In an embodiment, each Web service definition 424 references a virtual interface 422 and there may be multiple Web service definitions 424 for each virtual interface 422.

In an embodiment, Web service definition 424 does not contain system specific data (e.g., does not contain application server specific data). Since Web service definition 424 does not contain system specific data, it may be defined once and then transported to a variety of different systems. In an embodiment, transporting Web service definition 424 to a variety of different systems includes transporting Web service definition 424 across multiple scenarios in one system landscape (e.g., from a development system to a test system to a productive system, etc.). In an embodiment, transporting Web service definition 424 to a variety of different systems also includes transporting Web service definition 424 from a provider of Web services to a customer.

An advantage to the architecture of Web service 400 is that a single implementation 410 may be exposed in multiple ways. For example, implementation 410 may have multiple virtual interfaces 422. Each virtual interface 422 (or selected virtual interfaces 422) may, in turn, be defined by one or more Web service definitions 424. In contrast to the architecture of Web service 400, conventional, Web services generate separate implementations based on a single WSDL document.

In an embodiment, Web service configuration part 430 binds an abstract Web service to particular transports, bindings, and protocols. Web service configuration part 430 may include Web service 432 and Web service configuration 434. Web service 432 references Web service definition 424 and provide's a container for one or more Web service configurations 434. The term "container" broadly refers to an entity that provides services to another entity. The services provided by a container may include, for example, lifecycle management, security, connectivity, transactions, and/or persistence.

In an embodiment, Web service configuration 434 specifies which transport binding will be used, a security configuration, a target address, and/or documentation for the operations of the configuration. In addition, Web service configuration 434 may specify which design-time feature will be mapped to which runtime feature. The term "design time" refers to the design and development of computer software. The term "runtime" refers to the actual execution of software. In an embodiment, each Web service configuration 434 is mapped to a WSDL port. The term "port" may refer to an association between a port type and a binding. For further information regarding bindings see, for example, the SOAP specification.

In an embodiment a Web service, at runtime, may have a client-side implementation and a server-side implementation. For ease of reference the client-side implementation is hereinafter referred to as a "Web service client" and the server-side implementation is hereinafter referred to as the "Web service." The role of the Web service client is to expose a method of the Web service to a client application and to send a request for service to the Web service. The role of the Web service is to process the request and provide a response. The Web service and the Web service client are further discussed below with reference to FIGS. 5-6.

Figure 5:
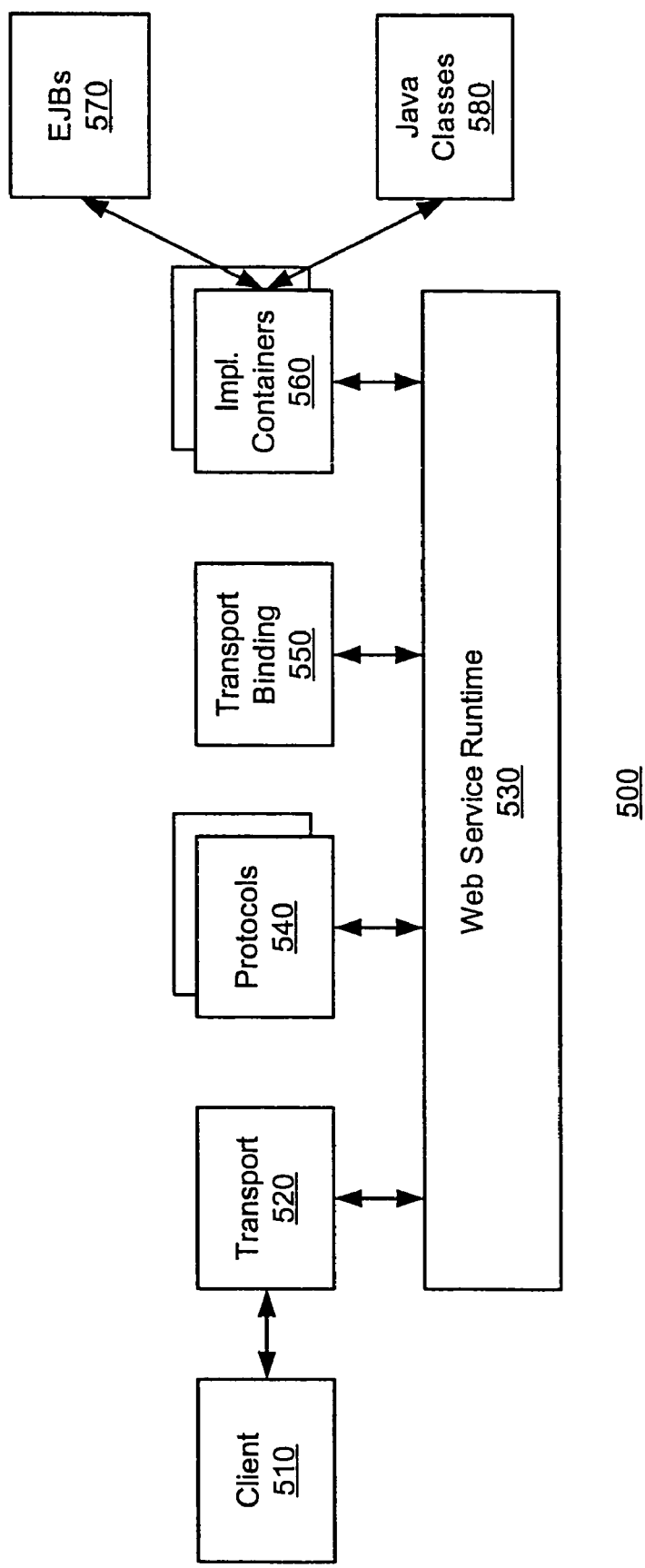
FIG. 5 is a block diagram illustrating selected aspects of the server-side of a Web service, according to an embodiment of the invention.

FIG. 5 is a block diagram illustrating selected aspects of the server-side of Web service 500, according to an embodiment of the invention. The illustrated embodiment of Web service 500 includes transport 520, Web service runtime 530, protocols 540, transport binding 550, and implementation containers 560. In an alternative embodiment, Web service 500 may include more, fewer, and/or different elements than those shown in FIG. 5. As illustrated in FIG. 5, Web service runtime 530 has a modular architecture. This modular architecture may be extended by, for example, adding (or removing) one or more protocols 540 and/or implementation containers 560. The components of Web service runtime 530 that may be selectively added and/or removed are referred to as "pluggable" components.

In an embodiment, transport 520 is an entity that receives a request for a Web service from client 510 and encapsulates that request in an identifier that specifies a configuration of Web service 500 that should process the received request. The identifier is used by Web service runtime 530 to determine which Web service configuration should process the received request. In an embodiment, a Web service configuration (e.g., Web service configuration 434, shown in FIG. 4) refers, in part, to the combination of protocols 540, transport binding 550, implementation container 560, and/or Web service implementation (e.g., Enterprise Java Bean 570 or Java classes 580) that processes the received request.

Web service runtime 530 takes the received request from transport 520 and determines which Web service configuration to invoke based on the identifier encapsulating the request. In an embodiment, the Web service configuration specifies which protocols 540 should be invoked to process the request. Protocols 540 are pluggable logic elements that process the request. In an embodiment protocols 540 may be security protocols (e.g., authentication and/or authorization protocols), session protocols, transport guarantee protocols, and the like. In an embodiment, protocols 540 are implemented as Java services.

The received request may include any of a number of data types and operation types that are mapped (or bound) to a transport layer protocol. In an embodiment, transport binding 550 converts the received request to, for example, Java objects that are used to invoke the Web service implementation (e.g., EJBs 570 or Java classes 580). Implementation containers 560 use the Java objects to invoke the methods of the Web service implementations. After the Web service implementation (e.g., EJBs 570 or Java classes 580) generates a response to the received request, transport binding 550 may convert a Java object representation of the response to a transport layer formatted response.

Figure 6:
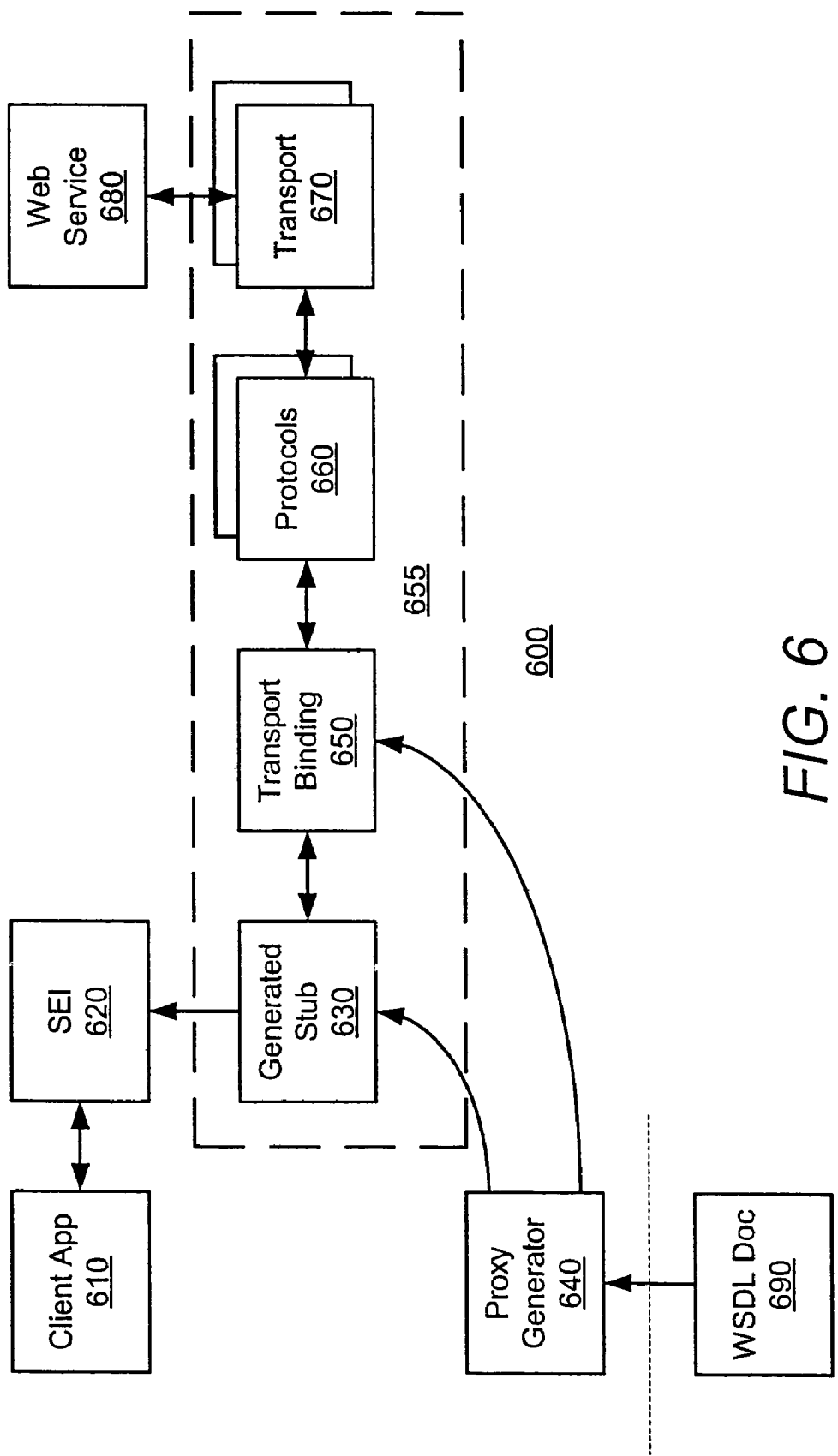
FIG. 6 is a block diagram of the general architecture of a Web service client, implemented according to an embodiment of the invention.

FIG. 6 is a block diagram of the general architecture of Web service client 600, implemented according to an embodiment of the invention. In an embodiment, Web service client 600 includes client application 610, Service Endpoint Interface (SEI) 620, generated stub 630, proxy generator 640, transport binding 650, protocols 660, and transport 670. In an alternative embodiment, Web service client 600 may include more, fewer, and/or different elements than those shown in FIG. 6. In the illustrated embodiment, Web service client framework 655 is modular and the various elements may, therefore, be referred to as being "pluggable."

Client application 610 may be any application that exchanges a request and/or a response with Web service 680. Client application 610 exchanges requests/responses with Web service 680 through one or more methods exposed by Service Endpoint Interface (SEI) 620. SEI 620 is the local representation of remote Web service 680. In an embodiment, SEI 620 also includes one or more logical ports (not shown) to provide a mechanism to locally configure Web service 680. For additional information regarding SEI 620 see, for example, the JAX-RPC specification and the JSR-109 specification.

Generated stub 630 includes the low-level classes that Web service client 600 uses to communicate with Web service 680. The low-level classes of generated stub 630 implement SEI 620. For additional information regarding generated stub 630 see, for example, the JAX-RPC specification. Proxy generator 640 parses WSDL document 690 and generates SEI 620 and stub 630 based, at least in part, on the information obtained from WSDL document 690. For additional information regarding proxy generator 640 see, for example, the JAX-RPC specification and the JSR-109 specification.

In an embodiment, transport binding 650 is a pluggable component that generates a request message(s) based on the settings of generated stub 630. When transport binding 650 receives a response(s) to the request message it converts the response from, for example, XML to Java objects. In an embodiment, transport binding 650 is implemented as a Java service. For additional information regarding transport binding 650 see, for example, the JAX-RPC specification and the JSR-109 specification.

In an embodiment, protocols 660 implement additional features (e.g., non-standardized functionalities) for Web service client 600. Examples of the features that may be implemented by protocols 660 include, but are not limited to, authentication functions, proxy server functions, header functions; and/or session functions. The functions implemented by protocols 660 may be independent of runtime features or may enhance runtime features. In an embodiment, protocols 660 are implemented as pluggable Java services. In an embodiment, protocols 660 use the SOAP message format to process incoming responses and/or outgoing requests. In alternative embodiments, protocols 660 implement a different message format.

Turning now to FIGS. 7-12, the particular methods associated with embodiments of the invention are described in terms of computer software and hardware with reference to a flowchart. The methods to be performed by a computing device (e.g., an application server) may constitute state machines or computer programs made up of computer-executable instructions. The computer-executable instructions may be written in a computer programming language or may be embodied in firmware logic. If written in a programming language conforming to a recognized standard, such instructions can be executed on a variety of hardware platforms and for interface to a variety of operating systems. In addition, embodiments of the invention are not described with reference to any particular programming language. It will be appreciated that a variety of programming languages may be used to implement embodiments of the invention as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

Figure 7:
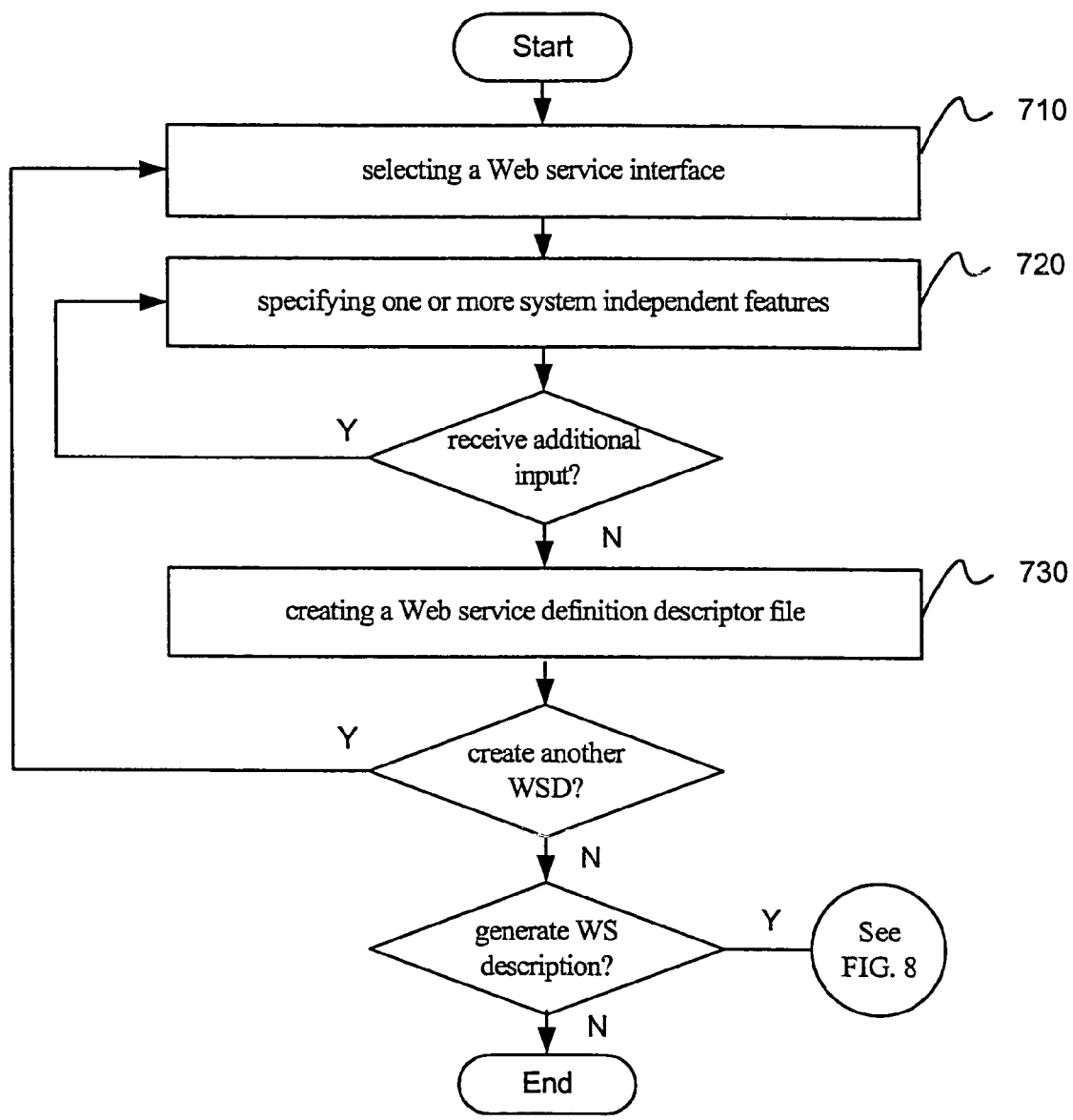
FIG. 7 is a flow diagram illustrating certain aspects of a method for creating a Web service definition, according to an embodiment of the invention.

FIG. 7 is a flow diagram illustrating certain aspects of a method for creating a Web service definition, according to an embodiment of the invention. Referring to process block 710, a development environment (or other computing entity) receives input selecting a Web service interface. The term "Web service interface" may refer to an entity that exposes the operations of a Web service to a client. The Web service interface may be local to or remote from the development environment. In one embodiment, the Web service interface is a virtual interface (e.g., virtual interface 422, shown in FIG. 4).

In an embodiment, the Web service interface may be selected via a Graphical User Interface (GUI). For example, a user may enter the name of a file representing the Web service interface in a GUI. Alternatively, the user may browse through a number of files displayed via the GUI and select the file representing the Web service interface. In such an embodiment, the term "receiving input selecting" may refer to receiving input from the GUI (e.g., via a cursor control device, keyboard, touch-screen, propagated signal, etc.) that indicates the user (or other entity) has selected the Web service interface. In an alternative embodiment, the input may be received via, for example, a command line interface. In such an embodiment, the term "receiving input selecting" may include receiving an indication that the user has entered a text-based command specifying a Web service interface.

Figure 8:
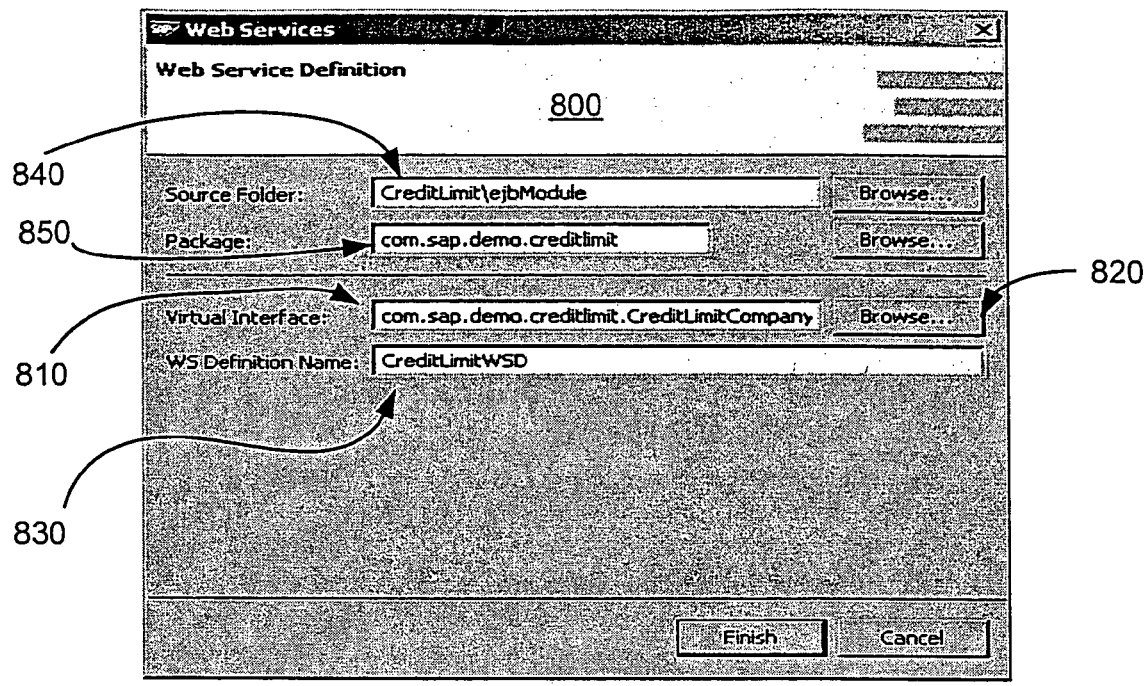
FIG. 8 illustrates aspects of selecting a Web service virtual interface according to an embodiment of the invention.

FIG. 8 illustrates aspects of selecting a Web service virtual interface according to an embodiment of the invention. In an embodiment, a user may enter the name of a virtual interface in field 810 of GUI 800. Alternatively, the user may select "browse" button 820 to browse one or more files that may contain the desired virtual interface. The name of a Web service definition corresponding to the selected virtual interface may be provided in field 830 (via, e.g., a keyboard).

The selected Web service interface may provide an interface to a Web service implementation. In an embodiment, GUI 800 provides a mechanism to select the Web service implementation as well as the Web service interface. For example, the user may identify a source folder containing the Web service implementation by providing an appropriate folder name in field 840. Similarly, a package containing the Web service implementation may be identified by providing a name in field 850.

Referring again to FIG. 7, the development environment may receive input specifying one or more system independent features of the selected Web service interface at reference numeral 720. The functionality of a Web service may include some features (or functions) that are specific to the system to which the Web service is deployed. For example, the URL used to access the Web service is specific to a given system. A Web service may also include some features (or functions) that are independent of the system to which the Web service is deployed. For example, whether a Web service provides stateful or stateless functions may be independent of the underlying system. The term "system independent features" refers to, for example, those functions of a Web service that are independent of the system to which the Web service is deployed. In an embodiment, a Web service definition specifies one or more system independent features of a Web service interface.

In some cases, the system independent features may be associated with certain system specific implementation details. In an embodiment, the system specific implementation details of these functions may be specified when the Web service is, for example, deployed to a system. For example, a developer may specify that a Web service provides stateful sessions and an administrator may specify, during deployment, that HTTP cookies be used to provide stateful sessions.

Figure 9:
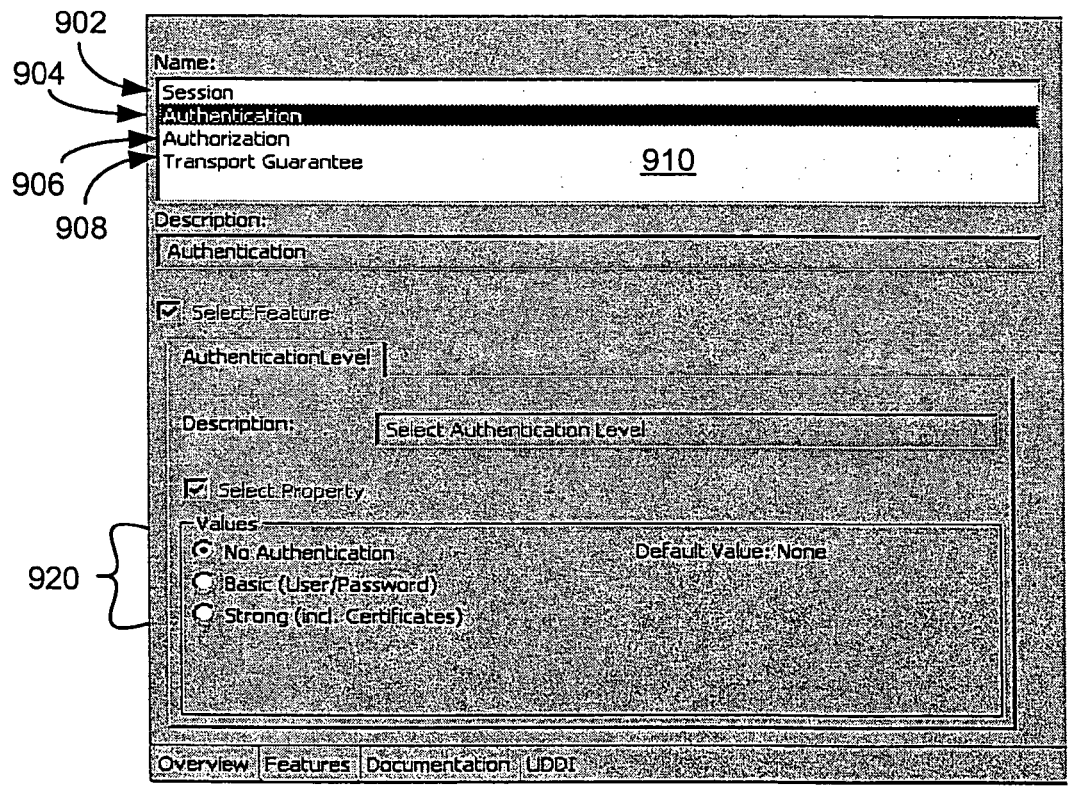
FIG. 9 illustrates selected aspects of specifying one or more system independent features according to an embodiment of the invention.

FIG. 9 illustrates selected aspects of specifying one or more system independent features according to an embodiment of the invention. In the illustrated embodiment, a user may select, for example, one of the system independent features shown in field 910. In an embodiment, the system independent features may include, for example, session feature 902, authentication feature 904, authorization feature 906, and/or transport guarantee feature 908. In an alternative embodiment, a Web service definition may specify more system independent features, fewer system independent features, and/or different system independent features. For example, in one embodiment, the system independent features may include a quality-of-service feature.

In an embodiment, a Web service definition may specify an "authentication feature" for a Web service interface. The term "authentication feature" refers to Web service functionality that authenticates a user's identity. In an embodiment, specifying an authentication feature may include specifying a minimum level of authentication. For example, in the illustrated embodiment, the minimum level of authentication may be set to: no authentication, basic authentication, or strong authentication. The basic authentication level may include the use of a user name and password. The strong authentication level may include the use of client certificates to validate a message. The term "client certificates" refers to using a message attribute to verify the identity of the message sender. The authentication feature may be selected by, for example, specifying one of the choices shown at reference numeral 920.

In an embodiment, a Web service definition may specify a "session feature" for a Web service interface. The term "session feature" broadly refers to functionality that controls a session between the Web service and a Web service client. The term "session" refers to an active connection between two nodes. In one embodiment, the session feature may specify either stateful or stateless sessions between a Web service and a Web service client. The term "stateful" refers to keeping track of, for example, configuration settings and/or transaction information during a session. The term "stateless" refers to not maintaining transaction information, configuration settings, and the like for a session.

In an embodiment, a Web service definition may specify an "authorization feature" for a Web service interface. The term "authorization feature" refers to functionality that determines whether a client calling a Web service method is authorized to call the method. In one embodiment, the authorization feature may include assigning security roles to one or more methods of the Web service (e.g., a first customer may be allowed to call a first method and a second customer may be allowed to call a second method). In one embodiment, the security roles may be assigned at design time and/or at runtime.

In an embodiment, a Web service definition may specify a "transport guarantee feature" for a Web service interface. The term "transport guarantee feature" refers to functionality that provides data confidentiality and/or data integrity. The term "data confidentiality" refers to specifying that data is only accessible to authorized users (e.g., via encrypting the data). The term "data integrity" refers to specifying that data exchanged between a Web service and a client is not changed during transit. Specifying a transport guarantee feature broadly refers to specifying that data exchanged between a Web service and a client is confidential (e.g., via encryption) and/or its integrity is protected (e.g., via a message digest).

Referring again to FIG. 7, the development environment may create a Web service definition descriptor file as shown by reference numeral 730. In one embodiment, the Web service definition descriptor file is an XML file that describes the Web service definition. The descriptor file may provide, at least in part, the basis for a Web service description (e.g., a WSDL document). The term "creating" the Web service definition descriptor file may refer to placing at least a portion of the received input specifying the one or more system independent features into a structured file such as an XML file.

In one embodiment, the Web service descriptor file provides part of the "design time" description of a Web service. The Web service descriptor file may be combined with, for example, a virtual interface descriptor file to provide, at least in part, the design time description of the Web service. This design time description of the Web service may provide the basis for a WSDL document.

Figure 10:
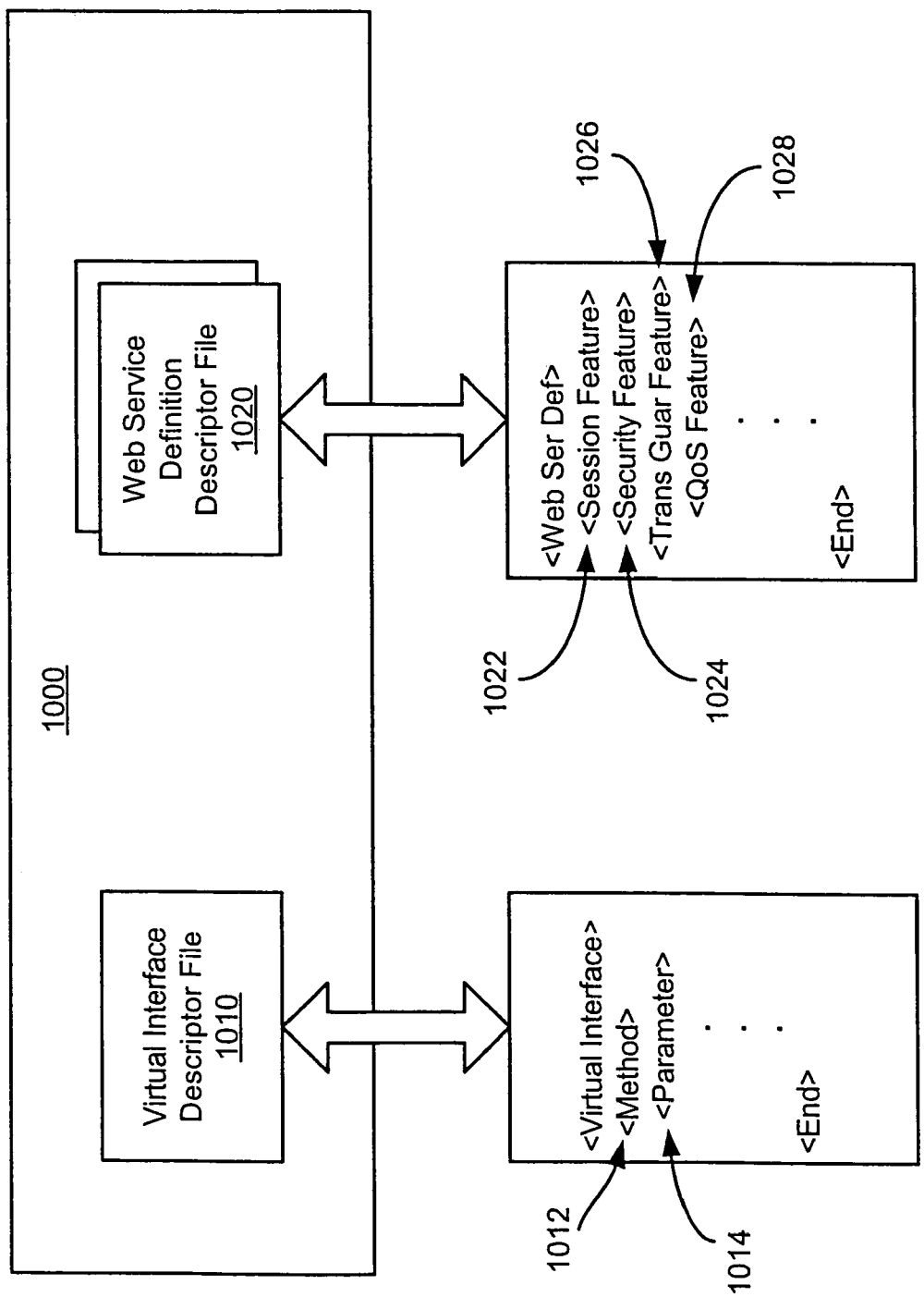
FIG. 10 is a block diagram illustrating selected aspects of a Web service design time part according to an embodiment of the invention.

FIG. 10 is a block diagram illustrating selected aspects of Web service design time part 1000 according to an embodiment of the invention. The illustrated embodiment includes virtual interface descriptor file 1010 and Web service definition descriptor file 1020. In an alternative embodiment, the design time description of the Web service may have more elements, fewer elements, and/or different elements.

Virtual interface descriptor file 1010 may describe a virtual interface of the Web service. For example, virtual interface descriptor file 1010 may specify which methods and/or parameters of a Web service implementation are exposed. In addition, virtual interface descriptor file 1010 may define message formatting details (e.g., SOAP message formatting details) such as namespaces for methods and/or parameters as well as whether a parameter is represented as an element or attribute in a message. For example, method element 1012 may include method specific data (e.g., whether it is exposed) and parameter element 1014 may include parameter specific data (e.g., a default value and/or whether it is to be represented as an element or an attribute in a message). In one embodiment, virtual interface descriptor file 1010 is an XML file. It is to be understood, however, that in alternative embodiments, virtual interface descriptor file 1010 may be structured according to a different format, markup language, etc.

Web service definition (WSD) descriptor file 1020 may provide a Web service definition for a Web service interface. In the illustrated embodiment, WSD descriptor file 1020 may specify one or more system independent features for the interface described by virtual interface descriptor file 1010. For example, session feature element 1022 may specify a session feature of the virtual interface such as whether sessions are stateful or stateless. Security feature 1024 may specify a security feature of the virtual interface. The term "security feature" may refer to, for example, an authentication feature and/or an authorization feature. Transport guarantee feature 1026 may specify whether the virtual interface is to provide data confidentiality and/or data integrity. Similarly, quality-of-service feature 1028 may specify, for example, whether the virtual interface is to ensure that a message sent between a Web service and a client is delivered exactly once. In one embodiment, WSD descriptor file 1020 is an XML file. It is to be understood, however, that in alternative embodiments, WSD descriptor file 1010 may be structured according to a different format, markup language, etc.

Figure 11:
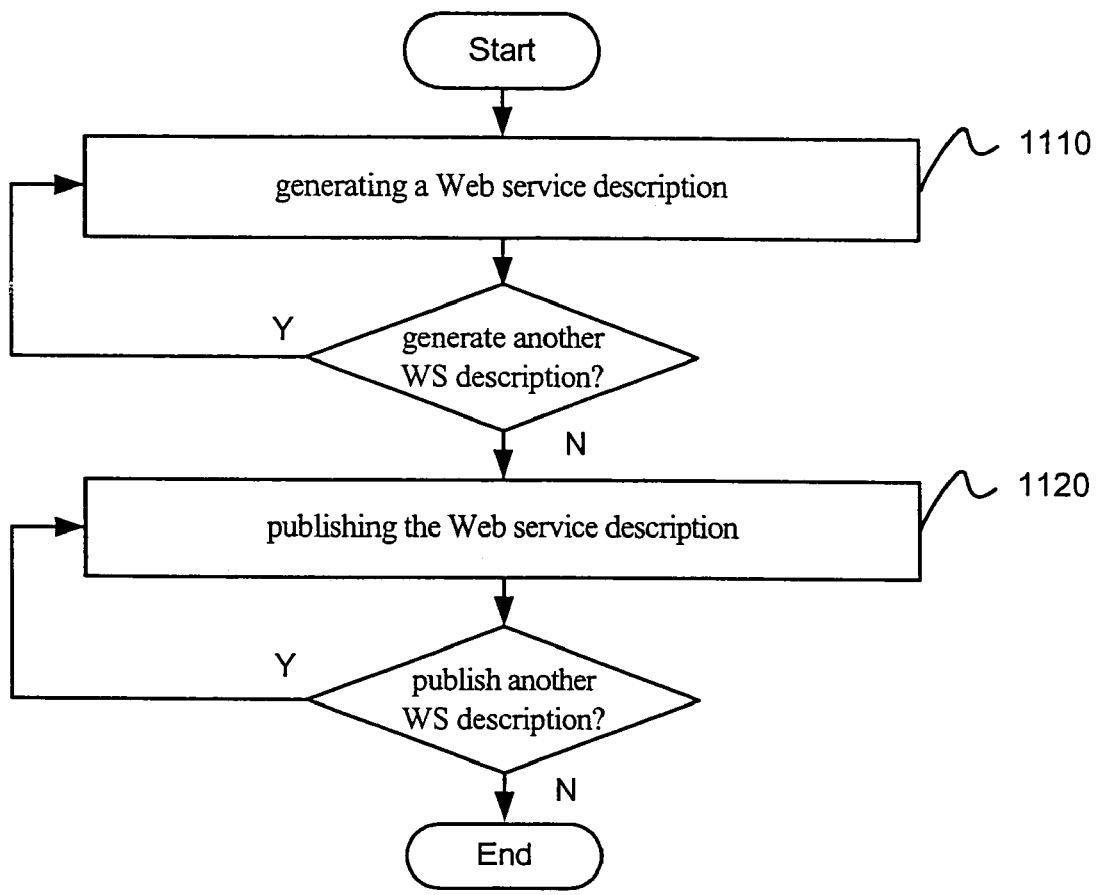
FIG. 11 is a flow diagram illustrating certain aspects of a method for employing a Web service definition, according to an embodiment of the invention.

FIG. 11 is a flow diagram illustrating certain aspects of a method for employing a Web service definition, according to an embodiment of the invention. Referring to process block 1110, a development environment may generate a Web service description based, at least in part, on a WSD descriptor file (e.g., WSD descriptor file 1020, shown in FIG. 10). In an embodiment, the Web service description may be a WSDL document. In such an embodiment, the development environment may parse the information contained in a WSD descriptor file (e.g., elements 1022, 1024, 1026, and 1028, shown in FIG. 10). The parsed information may be used to specify the elements of the WSDL document.

Figure 12:
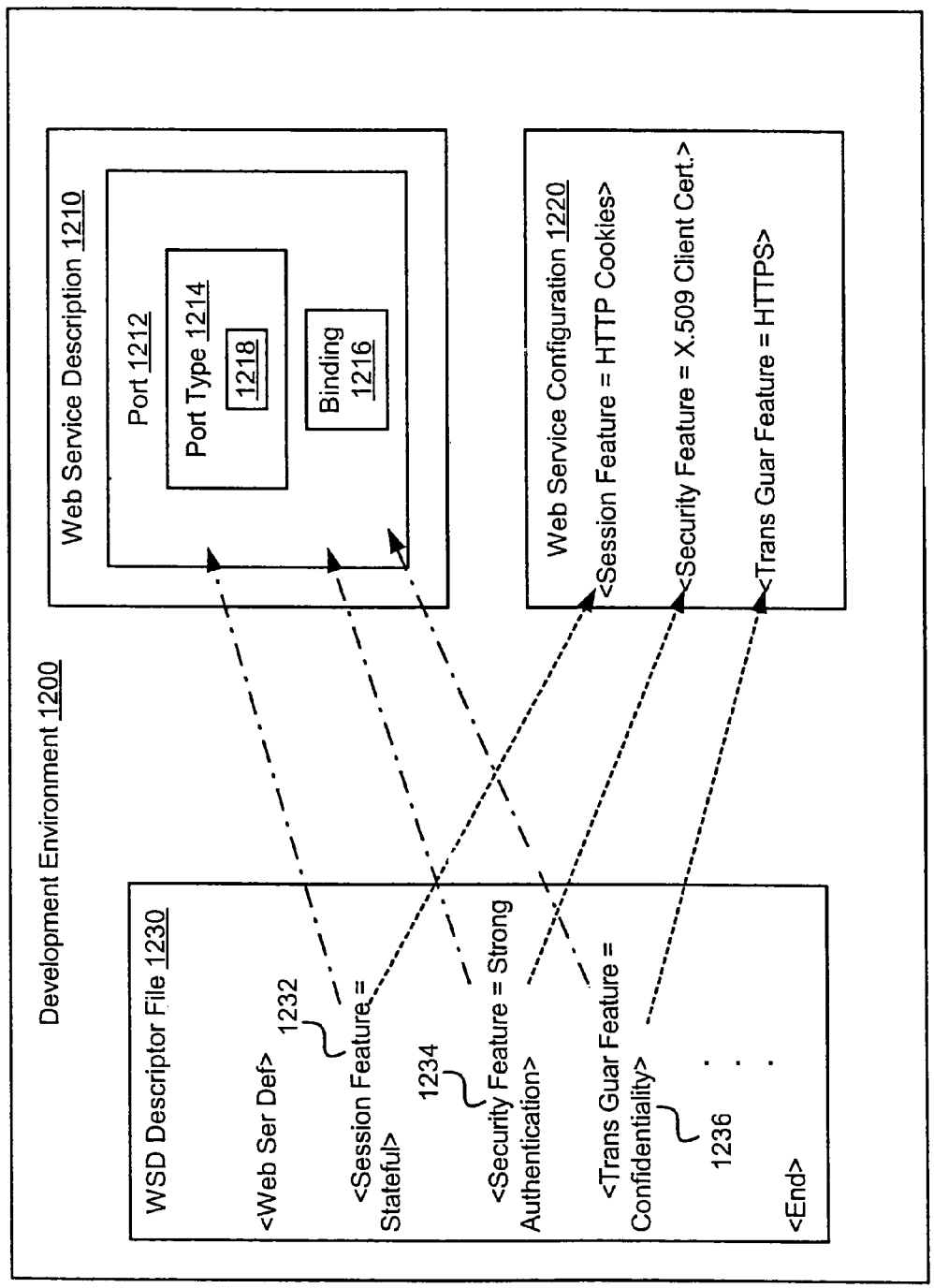
FIG. 12 is a conceptual diagram illustrating a development environment generating a Web service description and/or a Web service configuration based, at least in part, on a Web service definition descriptor file.

FIG. 12 is a conceptual diagram illustrating development environment 1200 generating Web service description 1210 and/or Web service configuration 1220 based, at least in part, on WSD descriptor file 1230. In one embodiment, Web service description 1210 is, for example, a WSDL document. Web service description 1210 may be the basis for a Web service client (not shown). In an embodiment, Web service description 1210 includes port 1212 which defines, at least in part, the operations of the Web service and the communication protocols (or bindings) used by the operations. The illustrated embodiment of port 1212 includes port type element (or, for ease of reference, port type) 1214 and binding element (or, for ease of reference, binding) 1216. Port type 1214 may define one or more Web service operations and the messages that the defined operations use (e.g., operation 1218). In an embodiment, port 1212 is a WSDL port and port type 1214 is a WSDL port type.

In an embodiment, binding 1216 may define message formats and communication protocol details for port 1212. In an embodiment, binding 1216 specifies a transport protocol to be used. Examples of transport protocols that may be used include, but are not limited to, HyperText Transfer Protocol (HTTP), SOAP over HTTP, SOAP over File Transfer Protocol (FTP), SOAP over Simple Mail Transfer Protocol (SMTP), and the like. The HTTP protocol refers to any of the HTTP protocols including, for example, the protocol described in Request For Comments (RFC) 2616 entitled, "HyperText Transport Protocol—HTTP/1.1," June 1999 (hereinafter, the HTTP protocol). The File Transfer Protocol refers to any of the FTPs including, for example, the FTP described in RFC 959 entitled, "File Transfer Protocol," October 1985. The Simple Mail Transfer Protocol refers to any of the SMTPs including, for example, the SMTP described in RFC 2821 and entitled, "Simple Mail Transfer Protocol," April 2001.

Web service configuration 1220 may specify the behavior of a Web service at runtime. For example, Web service configuration 1220 may specify which transport binding will be used, a security configuration, a target address, and/or documentation for the operations of the configuration. In addition, Web service configuration 1220 may specify which design-time feature will be mapped to which runtime feature.

In an embodiment, Web service description 1210 and Web service configuration 1220 are based on the abstract metadata of a Web service design time part (e.g., Web service design time part 1000, shown in FIG. 10) rather than a Web service implementation. Thus, in an embodiment, a SOAP runtime implementation (not shown) is not specific to a Web service implementation. Instead, it is based, at least in part, on the generic metadata of, for example, WSD descriptor file 1230.

In an embodiment, development environment 1200 parses the information contained in WSD descriptor file 1230 and maps the parsed data into Web service description 1210. For example, session feature element 1232 may be mapped to, for example, port type element 1214 of Web service description 1210. Similarly, development environment 1200 may map the data contained in security feature element 1234 and transport guarantee element 1236 to, for example, binding 1216 of Web service description 1210. In alternative embodiments, the structures of Web service description 1210 and/or WSD descriptor file 1230 may be different than the structures illustrated in FIG. 12. In addition, the mapping of information between WSD descriptor file 1220 and Web service description 1210 may vary in an alternative embodiment of the invention.

In an embodiment, the technical features of Web service configuration 1220 may be assigned based, at least in part, on the system independent features specified in WSD descriptor file 1230. For example, development environment 1200 may assign the technical feature of HTTP cookies to Web service configuration 1220 based, at least in part, on the abstract feature "stateful" in session feature element 1232. Also, the technical feature of X.509 client certificates may be assigned to Web service configuration 1220 based, at least in part, on the abstract feature of "strong authentication" in security feature element 1234. The term "X.509 client certificates" broadly refers to certificates based on any of the X.509 standards, for example, the standard specified in the International Telecommunication Union—Telecommunication Standardization Sector (ITU-T) Recommendation X.509 (August, 1997) Authentication Framework. As shown in FIG. 12, the technical feature of transport with HTTPS may be assigned to Web service configuration 1220 based, at least in part, on the abstract feature "confidentiality" in transport guarantee element 1236. The specific assignment of technical features shown in FIG. 12 is for illustrative purposes. It is to be understood that different technical features may be assigned to provide the abstract functionality specified by WSD descriptor file 1230, without departing from the scope of embodiments of the invention. Also, more features, fewer features, and/or different features may be assigned to Web service configuration 1220.

Figure 1:
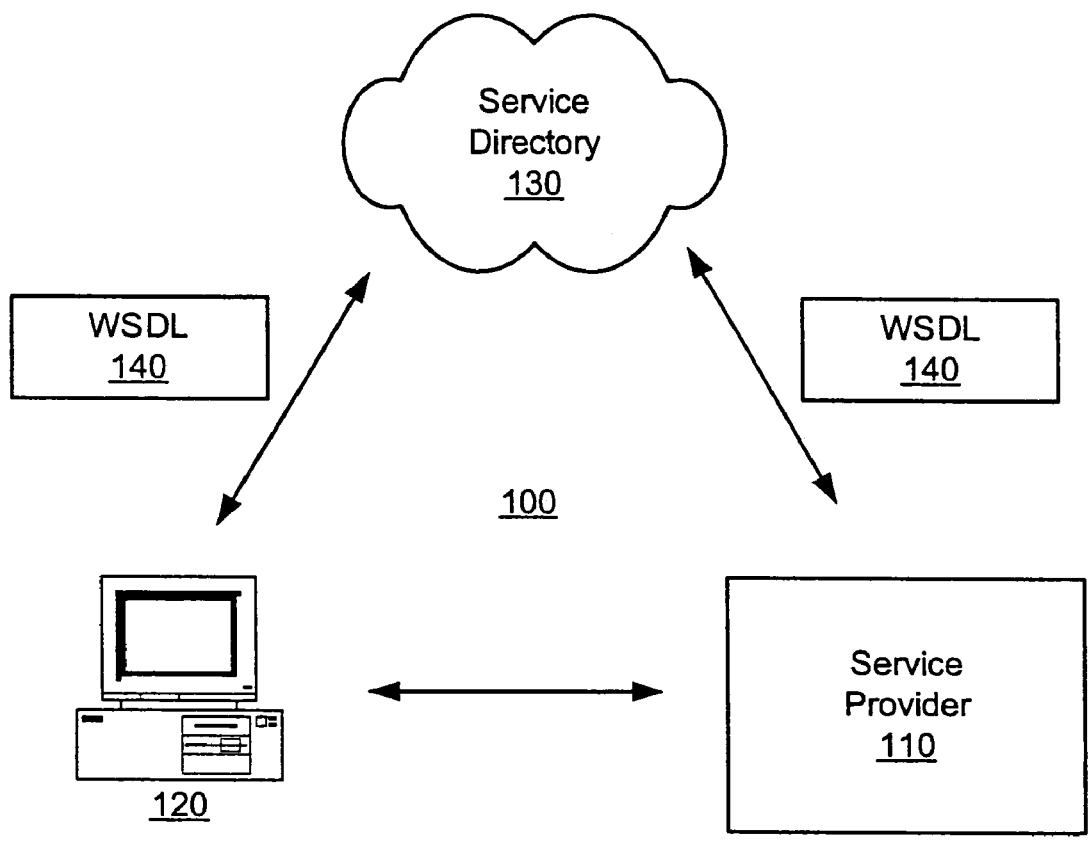
FIG. 1 is a block diagram of the basic architecture of a conventional Web service framework.

Referring again to FIG. 11, the Web service description (e.g., Web service description 1210, shown in FIG. 12), may be published to a service directory (e.g., service directory 130, shown in FIG. 1) as shown by reference numeral 1120. The term "publish" refers to providing the Web service description to the service directory (e.g., via a network) so that the directory may make the Web service description available to one or more potential Web service consumers. In one embodiment, the service directory implements, at least in part, the UDDI specification.

Figure 13:
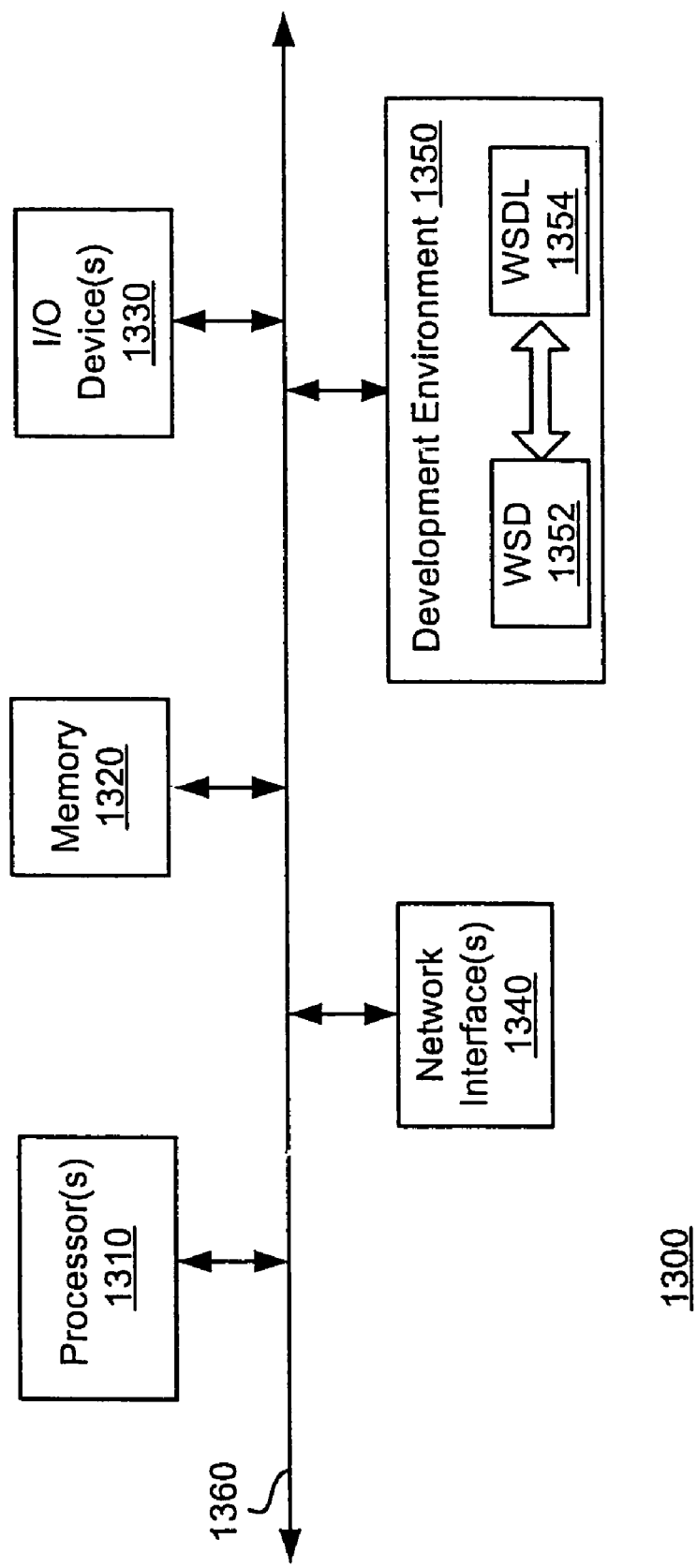
FIG. 13 is a block diagram of a node implemented according to an embodiment of the invention.

FIG. 13 is a block diagram of node 1300 implemented according to an embodiment of the invention. Node 1300 may include: processor(s) 1310, memory 1320, one or more Input/Output devices 1330, network interface(s) 1340, and development environment 1350. The illustrated elements may be connected together through system interconnection 1360. Processor(s) 1310 may include a microprocessor, microcontroller, field programmable gate array (FPGA), application specific integrated circuit (ASIC), central processing unit (CPU), programmable logic device (PLD), and similar devices that access instructions from system storage (e.g., memory 1320), decode them, and execute those instructions by performing arithmetic and logical operations.

Development environment 1350 may enable node 1300 to create Web service definition (WSD) descriptor file 1352. In addition, development environment 1350 may enable node 1300 to generate WSDL document 1354 (or other Web service description) based, at least in part, on WSD descriptor file 1352. Development environment 1350 may be executable content, control logic (e.g., ASIC, PLD, FPGA, etc.), firmware, or some combination thereof, in an embodiment of the invention. In embodiments of the invention in which development environment 1350 is executable content, it may be stored in memory 1320 and executed by processor(s) 1310.

Memory 1320 may encompass a wide variety of memory devices including read-only memory (ROM), erasable programmable read-only memory (EPROM), electrically erasable programmable read-only memory (EEPROM), random access memory (RAM), non-volatile random access memory (NVRAM), cache memory, flash memory, and other memory devices. Memory 1320 may also include one or more hard disks, floppy disks, ZIP disks, compact disks (e.g., CD-ROM), digital versatile/video disks (DVD), magnetic random access memory (MRAM) devices, and other system-readable media that store instructions and/or data. Memory 1320 may store program modules such as routines, programs, objects, images, data structures, program data, and other program modules that perform particular tasks or implement particular abstract data types that facilitate system use.

One or more I/O devices 1330 may include a hard disk drive interface, a magnetic disk drive interface, an optical drive interface, a parallel port, serial controller or super I/O controller, serial port, universal serial bus (USB) port, a display device interface (e.g., video adapter), a network interface card (NIC), a sound card, modem, and the like. System interconnection 1360 permits communication between the various elements of node 1300. System interconnection 1360 may include a wide variety of signal lines including one or more of a memory bus, peripheral bus, local bus, host bus, bridge, optical, electrical, acoustical, and other propagated signal lines.

Elements of embodiments of the present invention may also be provided as an article of manufacture, such as a machine-readable storage medium for storing the machine-executable instructions. The machine-readable storage medium may include, but is not limited to, flash memory, optical disks, CD-ROMs, DVD ROMs, RAMs, EPROMs, EEPROMs, magnetic or optical cards, or other type of machine-readable storage media suitable for storing electronic instructions. Embodiments of the present invention may also be downloaded as a computer program which may be transferred from a remote computer (e.g., a server) to a requesting computer (e.g., a client) by way of data signals embodied in a carrier wave or other propagation or machine-readable communication medium via a communication link (e.g., a modem or network connection).

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or one "embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A method for generating a definition of a Web service comprising:

receiving input selecting a Web service virtual interface that represents an abstract interface defining at least one of a plurality of views of a Web service implementation, the Web service implementation providing logic for a Web service, the plurality of views selectively exposing methods and parameters of the Web service implementation;

receiving input specifying one or more system independent features for the selected virtual interface;

creating a Web service definition descriptor file corresponding to the selected virtual interface based on
        generic metadata of the selected virtual interface, the generic metadata providing an abstraction layer over endpoint types underlying the logic for the Web service provided by the Web service implementation, and
        the one or more system independent features specified for the selected virtual interface;

wherein the Web service definition descriptor file and the selected virtual interface provide a system independent design time description of the Web service;

generating a Web service description of the at least one of the plurality of views of the Web service implementation defined by the selected virtual interface, wherein the Web service description is a Web Service Description Language (WSDL) file that is based, at least in part, on the Web service definition descriptor file and the selected virtual interface to provide the system independent design time description of the Web service; and referencing a Web service configuration to generate the Web service description, the Web service configuration mapping the system independent design time description of the Web service provided in the generated WSDL file to particular transports, bindings and protocols.

2. The method of claim 1, wherein receiving input specifying one or more system independent features for the selected virtual interface comprises:

receiving input specifying at least one of
        a session feature,
        a security feature,
        a transport guarantee feature, and
        a quality-of-service feature.

3. The method of claim 2, wherein receiving input specifying the session feature of the selected virtual interface comprises:

receiving input specifying that a session between the selected virtual interface and a Web service client is to be stateful.

4. The method of claim 2, wherein receiving input specifying a session feature of the selected virtual interface comprises:
receiving input specifying that a session between the selected virtual interface and a Web service client is to be stateless.

5. The method of claim 2, wherein receiving input specifying the security feature of the selected virtual interface comprises:
receiving input specifying an authentication feature of the virtual interface.

6. The method of claim 5, wherein receiving input specifying the authentication feature of the selected virtual interface comprises:
receiving input specifying a minimum level of authentication.

7. The method of claim 6, wherein receiving input specifying the minimum level of authentication comprises at least one of:
receiving input specifying no authentication for a call from a Web service client;
receiving input specifying the Web service client is to provide a user identifier and a password; and
receiving input specifying the use of client certificates.

8. The method of claim 2, wherein receiving input specifying the transport guarantee feature of the selected virtual interface comprises at least one of:
receiving input specifying message integrity for a message sent between the virtual interface and a Web service client;
receiving input specifying message confidentiality; and
receiving input specifying both message integrity and message confidentiality.

9. The method of claim 8, wherein receiving input specifying message confidentiality comprises:
receiving input specifying the message is to be encrypted.

10. The method of claim 2, wherein receiving input specifying the quality-of-service feature of the selected virtual interface comprises:
receiving input specifying that a message sent between the virtual interface and a Web service client is sent once.

11. The method of claim 1, further comprising:
publishing the Web service description on a service directory.

12. The method of claim 1, wherein the plurality of views selectively exposing methods and parameters of the Web service implementation includes a view that facilitates at least one of renaming and hiding methods and parameters of the Web service implementation.

13. The method of claim 1, wherein the plurality of views selectively exposing methods and parameters of the Web service implementation includes a view that facilitates defining standard values for the parameters of the Web service implementation.

14. The method of claim 1, wherein the plurality of views selectively exposing methods and parameters of the Web service implementation includes a view that facilitates converting parameter types of the parameters of the Web service implementation, including converting integer parameter types to string parameter types and string parameter types to integer parameter types.

15. The method of claim 1, wherein the plurality of views selectively exposing methods and parameters of the Web service implementation includes a view that facilitates defining how parameters of the Web service implementation are represented in a protocol, including how parameters of the Web service implementation are represented in the SOAP protocol.

16. An apparatus to generate a definition of a Web service comprising:
a development environment to create a Web service virtual interface that represents an abstract interface defining at least one of a plurality of views of a Web service implementation, the Web service implementation providing logic for a Web service, the plurality of views selectively exposing methods and parameters of the Web service implementation; and
a processor and logic executable thereon to
receive input selecting the virtual interface;
receive input specifying one or more system independent features for the selected virtual interface;
create a Web service definition descriptor file corresponding to the selected virtual interface based on
generic metadata of the selected virtual interface, the generic metadata providing an abstraction layer over endpoint types underlying the logic for the Web service provided by the Web service implementation, and
the one or more system independent features specified for the selected virtual interface;
wherein the Web service definition descriptor file and the selected virtual interface provide a system independent design time description of the Web service;
generate a Web service description of the at least one of the plurality of views of the Web service implementation defined by the selected virtual interface, wherein the Web service description is a Web Service Description Language (WSDL) file that is based, at least in part, on the Web service definition descriptor file and the selected virtual interface to provide the system independent design time description of the Web service; and
reference a Web service configuration to generate the Web service description, the Web service configuration mapping the system independent design time description of the Web service provided in the generated WSDL file to particular transports, bindings and protocols.

17. The apparatus of claim 16, wherein the processor and logic executable thereon to receive input specifying one or more system independent features for the selected virtual interface comprises a processor and logic executable thereon to receive input specifying at least one of
a session feature,
a security feature,
a transport guarantee feature, and
a quality-of-service feature.

18. The apparatus of claim 17, wherein the processor and logic executable thereon is further to
generate a Web service description of the Web service implementation based, at least in part, on the Web service definition descriptor file; and
publish the Web service description on a service directory.

19. The apparatus of claim 16, wherein the plurality of views selectively exposing methods and parameters of the Web service implementation includes a view that facilitates at least one of renaming and hiding methods and parameters of the Web service implementation.

20. The apparatus of claim 16, wherein the plurality of views selectively exposing methods and parameters of the Web service implementation includes a view that facilitates defining standard values for the parameters of the Web service implementation.

21. The apparatus of claim 16, wherein the plurality of views selectively exposing methods and parameters of the Web service implementation includes a view that facilitates converting parameter types of the parameters of the Web service implementation, including converting integer parameter types to string parameter types and string parameter types to integer parameter types.

22. The apparatus of claim 16, wherein the plurality of views selectively exposing methods and parameters of the Web service implementation includes a view that facilitates defining how parameters of the Web service implementation are represented in a protocol, including how parameters of the Web service implementation are represented in the SOAP protocol.

23. A system for generating a definition of a Web service comprising:
   means for receiving input selecting a Web service virtual interface that represents an abstract interface defining at least one of a plurality of views of a Web service implementation, the Web service implementation providing logic for a Web service, the plurality of views selectively exposing methods and parameters of the Web service implementation;
   means for receiving input specifying one or more system independent features for the selected virtual interface;
   means for creating a Web service definition descriptor file corresponding to the selected virtual interface based on
      the generic metadata of the selected virtual interface, the generic metadata providing an abstraction layer over endpoint types underlying the logic for the Web service provided by the Web service implementation, and
      the one or more system independent features specified for the selected virtual interface;
   wherein the Web service definition descriptor file and the selected virtual interface provide a system independent design time description of the Web service;
   means for generating a Web service description of the at least one of the plurality of views of the Web service implementation defined by the selected virtual interface, including means for generating a Web Service Description Language (WSDL) file that is based, at least in part, on the Web service definition descriptor file and the selected virtual interface to provide the system independent design time description of the Web service; and
   means for referencing a Web service configuration in the means for generating the Web service description, the Web service configuration providing a means for mapping the system independent design time description of the Web service provided in the generated WSDL file to particular transports, bindings and protocols.

24. The system of claim 23, wherein the means for receiving input specifying one or more system independent features for the selected virtual interface comprises:
   means for receiving input specifying at least one of
      a session feature,
      a security feature,
      a transport guarantee feature, and
      a quality-of-service feature.

25. The system of claim 24, wherein the means for receiving input specifying the session feature of the selected virtual interface comprises:
   means for receiving input specifying that a session between the selected virtual interface and a Web service client is to be stateful.

26. The system of claim 24, wherein the means for receiving input specifying the security feature of the selected virtual interface comprises:
   means for receiving input specifying an authentication feature of the virtual interface.

27. The system of claim 24, wherein the means for receiving input specifying a security feature of the selected virtual interface comprises:
   means for receiving input specifying an authorization feature for the selected virtual interface.

28. The system of claim 24, wherein receiving input specifying the transport guarantee feature of the selected virtual interface comprises at least one of:
   receiving input specifying message integrity for a message sent between the virtual interface and a Web service client;
   receiving input specifying message confidentiality for the message; and
   receiving input specifying both message integrity and message confidentiality for the message.

29. The system of claim 23, wherein the plurality of views selectively exposing methods and parameters of the Web service implementation includes a view that facilitates at least one of renaming and hiding methods and parameters of the Web service implementation.

30. The system of claim 23, wherein the plurality of views selectively exposing methods and parameters of the Web service implementation includes a view that facilitates defining standard values for the parameters of the Web service implementation.

31. The system of claim 23, wherein the plurality of views selectively exposing methods and parameters of the Web service implementation includes a view that facilitates converting parameter types of the parameters of the Web service implementation, including converting integer parameter types to string parameter types and string parameter types to integer parameter types.

32. The system of claim 23, wherein the plurality of views selectively exposing methods and parameters of the Web service implementation includes a view that facilitates defining how parameters of the Web service implementation are represented in a protocol, including how parameters of the Web service implementation are represented in the SOAP protocol.

33. An article of manufacture for generating a definition of a Web service comprising:
   an machine-readable storage medium providing instructions that, when executed by an apparatus, cause the apparatus to
   receive input selecting a Web service virtual interface, the selected virtual interface representing an abstract interface defining at least one of a plurality of views of a Web service implementation, the Web service implementation providing logic for a Web service, the plurality of views selectively exposing, at least in part, methods and parameters of an interface for the Web service implementation;
   receive input specifying one or more system independent features for the selected virtual interface;
   create a Web service definition descriptor file corresponding to the selected virtual interface based on
      generic metadata of the selected virtual interface, the generic metadata providing an abstraction layer over endpoint types underlying the logic for the Web service provided by the Web service implementation, and the one or more system independent features specified for the selected virtual interface;

wherein the Web service definition descriptor file and the selected virtual interface provide a system independent design time description of the Web service;

generate a Web service description of the at least one of the plurality of views of the Web service implementation defined by the selected virtual interface wherein the Web service description is a Web Service Description Language (WSDL) file that is based, at least in part, on the Web service definition descriptor file and the selected virtual interface to provide the system independent design time description of the Web service; and reference a Web service configuration to generate the Web service description, the Web service configuration mapping the system independent design time description of the Web service provided in the generated WSDL file to particular transports, bindings and protocols.

34. The article of manufacture of claim 33, wherein the instructions that, when executed by the apparatus, cause the apparatus to receive input specifying one or more system independent features for the selected virtual interface cause the apparatus to receive input specifying at least one of a session feature, a security feature, a transport guarantee feature, and a quality-of-service feature.

35. The article of manufacture of claim 34, wherein the instructions that, when executed by the apparatus, cause the apparatus to receive input specifying the session feature of the selected virtual interface cause the apparatus to receive input specifying that a session between the selected virtual interface and a Web service client is to be stateless.

36. The article of manufacture of claim 34, wherein the instructions that, when executed by the apparatus, cause the apparatus to receive input specifying the security feature of the selected virtual interface cause the apparatus to receive input specifying an authentication feature of the virtual interface.

37. The article of manufacture of claim 36, wherein the instructions that, when executed by the apparatus, cause the apparatus to receive input specifying the authentication feature of the selected virtual interface cause the apparatus to perform at least one of receive input specifying no authentication for a call from a Web service client;

receive input specifying the Web service client is to provide a user identifier and a password; and receive input specifying the use of client certificates.

38. The article of manufacture of claim 36, wherein the instructions that, when executed by the apparatus, cause the apparatus to receive input specifying the transport guarantee feature of the selected virtual interface cause the apparatus to perform at least one of receive input specifying message integrity for a message sent between the virtual interface and a Web service client;

receive input specifying message confidentiality; and receive input specifying both message integrity and message confidentiality.

39. The article of manufacture of claim 33, wherein the machine-readable storage medium provides further instructions that, when executed by the apparatus, cause the apparatus to receive input specifying that a message sent between the virtual interface and a Web service client is sent once; and publish the Web service description on a service directory.

40. The article of manufacture of claim 33, wherein the view selectively exposing methods and parameters of the Web service implementation includes a view that facilitates at least one of renaming and hiding methods and parameters of the Web service implementation.

41. The article of manufacture of claim 33, wherein the view selectively exposing methods and parameters of the Web service implementation includes a view that facilitates defining standard values for the parameters of the Web service implementation.

42. The article of manufacture of claim 33, wherein the view selectively exposing methods and parameters of the Web service implementation includes a view that facilitates converting parameter types of the parameters of the Web service implementation, including converting integer parameter types to string parameter types and string parameter types to integer parameter types.

43. The article of manufacture of claim 33, wherein the view selectively exposing methods and parameters of the Web service implementation includes a view that facilitates defining how parameters of the Web service implementation are represented in a protocol, including how parameters of the Web service implementation are represented in the SOAP protocol.

* * * * *

UNITED STATES PATENT AND TRADEMARK OFFICE
CERTIFICATE OF CORRECTION

PATENT NO. : 7,620,934 B2  Page 1 of 1
APPLICATION NO. : 10/856073
DATED : November 17, 2009
INVENTOR(S) : Falter et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 485 days.

Signed and Sealed this

Twenty-sixth Day of October, 2010

David J. Kappos
*Director of the United States Patent and Trademark Office*